(12) United States Patent
Golov (10) Patent No.: US 12,260,111 B2
(45) Date of Patent: Mar. 25, 2025

(54) REDUCTION OF WRITE AMPLIFICATION IN SENSOR DATA RECORDERS

(71) Applicant: Micron Technology, Inc., Boise, ID (US)

(72) Inventor: Gil Golov, Backnang (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/219,327

(22) Filed: Mar. 31, 2021

(65) Prior Publication Data

US 2022/0317918 A1 Oct. 6, 2022

(51) Int. Cl.
*G06F 3/06* (2006.01)
*G07C 5/08* (2006.01)

(52) U.S. Cl.
CPC .......... *G06F 3/0655* (2013.01); *G06F 3/0604* (2013.01); *G06F 3/0679* (2013.01); *G07C 5/0866* (2013.01)

(58) Field of Classification Search
USPC ........................................................ 711/154
See application file for complete search history.

(56) References Cited

U.S. PATENT DOCUMENTS

| | | | |
|---|---|---|---|
| 10,417,251 B2* | 9/2019 | Willson | G06F 16/211 |
| 10,447,926 B1* | 10/2019 | Brailovskiy | H04N 23/683 |
| 11,909,667 B2* | 2/2024 | Yousefi | H04L 69/08 |
| 2008/0306723 A1* | 12/2008 | De Ambroggi | G11C 14/0063 |
| | | | 711/170 |
| 2016/0132257 A1* | 5/2016 | Chahwan | G06F 3/0656 |
| | | | 711/102 |
| 2016/0278067 A1* | 9/2016 | Badam | H04W 72/048 |
| 2016/0306583 A1* | 10/2016 | Yun | G06F 16/188 |
| 2018/0121351 A1* | 5/2018 | Zhang | G11C 8/06 |
| 2019/0090105 A1* | 3/2019 | Nourbakhsh | G06F 9/544 |
| 2019/0095121 A1* | 3/2019 | Gieseke | G06F 3/0656 |
| 2019/0220697 A1* | 7/2019 | Kiemele | G06F 18/217 |
| 2019/0230325 A1* | 7/2019 | Yamada | G06V 20/62 |
| 2019/0278638 A1* | 9/2019 | Kim | G06F 9/44 |
| 2019/0287319 A1* | 9/2019 | Golov | G06F 11/0796 |
| 2019/0348074 A1* | 11/2019 | Chou | H04N 5/772 |
| 2019/0356897 A1* | 11/2019 | Karivaradaswamy | |
| | | | H04N 13/139 |
| 2020/0202465 A1* | 6/2020 | Massover | G06F 21/6272 |

FOREIGN PATENT DOCUMENTS

| | | | |
|---|---|---|---|
| CN | 112825024 A | * 5/2021 | |
| JP | 2019028761 A | * 2/2019 | G06K 9/00805 |

OTHER PUBLICATIONS

Translation of Wang: CN112825024A.*

* cited by examiner

*Primary Examiner* — Yaima Rigol
*Assistant Examiner* — Elias Young Kim
(74) *Attorney, Agent, or Firm* — Greenberg Traurig (57) ABSTRACT

A system including sensors of an advanced driver assistance system and a data recorder. The data recorder has: a volatile memory; a non-volatile memory configured with a file system region and a buffer region; and a processor configured to implement a file system mounted in the file system region. The data recorder records outputs from the sensors via the volatile memory into the buffer region in a cyclic way and, in response to an event, retrieve sensor data from the buffer region and store the sensor data into files organized under the file system mounted in the file system region.

19 Claims, 6 Drawing Sheets

REDUCTION OF WRITE AMPLIFICATION IN SENSOR DATA RECORDERS

TECHNICAL FIELD

At least some embodiments disclosed herein relate to memory systems in general and, more particularly but not limited to, sensor data recorders of autonomous vehicles or vehicles with Advanced driver-assistance systems (ADAS).

BACKGROUND

A sensor data recorder for an autonomous vehicle or an Advanced driver-assistance system (ADAS), also referred to as a vehicle black box in a way similar to a flight recorder of an aircraft, is typically configured to record sensor data in a time period leading to an event, such as an accident. The recorded data can be used in the investigation and analysis of the event.

To capture the sensor data in a predetermined length of time period before the event occurs, a sensor data recorder is typically configured to store received input of sensor data in a cyclic way such that the sensor data generated within the most recent time period of the predetermined length is available in the sensor data recorder. In the absence of a triggering event (e.g., an accident), the oldest input is overwritten by the most recent input such that the sensor data from the most recent time period of the predetermined length remains available in the sensor data recorder, as the time passes and more sensor data is received as input. In response to a triggering event, the copy of the sensor data collected in the time period prior to the event can be preserved and prevented from being overwritten.

A memory sub-system can be used to implement a sensor data recorder. The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

A memory device can include a memory integrated circuit having one or more arrays of memory cells formed on an integrated circuit die of semiconducting material. A memory cell is a smallest unit of memory that can be individually used or operated upon to store data. In general, a memory cell can store one or more bits of data.

Different types of memory cells have been developed for memory integrated circuits, such as random access memory (RAM), read-only memory (ROM), dynamic random access memory (DRAM), static random access memory (SRAM), synchronous dynamic random access memory (SDRAM), phase change memory (PCM), magneto random access memory (MRAM), negative-or (NOR) flash memory, electrically erasable programmable read-only memory (EEPROM), flash memory, etc.

Some integrated circuit memory cells are volatile and require power to maintain data stored in the cells. Examples of volatile memory include Dynamic Random-Access Memory (DRAM) and Static Random-Access Memory (SRAM).

Some integrated circuit memory cells are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc. Flash memory includes negative-and (NAND) type flash memory or a negative-or (NOR) type flash memory. A NAND memory cell is based on a NAND logic gate; and a NOR memory cell is based on a NOR logic gate.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to a sensor data recorder of a vehicle configured with reduced write amplification while allowing enhanced access to sensor data via a file system.

Storing sensor data in a data recorder using a file system provides a simplified and/or user friendly way to access and manage the sensor data. However, writing sensor data into the data recorder via a file system can increase write amplification, reduce endurance, reduce sustained write speed, and/or increase data latency.

At least some aspects of the present disclosure address the above and other deficiencies by configuring a buffer region and a file system region in a non-volatile memory of a data recorder. The buffer region is used to store the most recent period of sensor data in a cyclic way. In response to a triggering event (e.g., an accident or near accident), the data recorder retrieves the sensor data of the period leading to the event from the buffer region and writes the sensor data into the file system region in files managed under a file system. Thus, the write amplification, increased latency, reduced sustained speed, and/or other disadvantages associated with tracking the most recent period of sensor data via the file system can be eliminated, while the sensor data preserved for an event can be accessed and/or managed via the flexibility of the file system.

Figure 1:
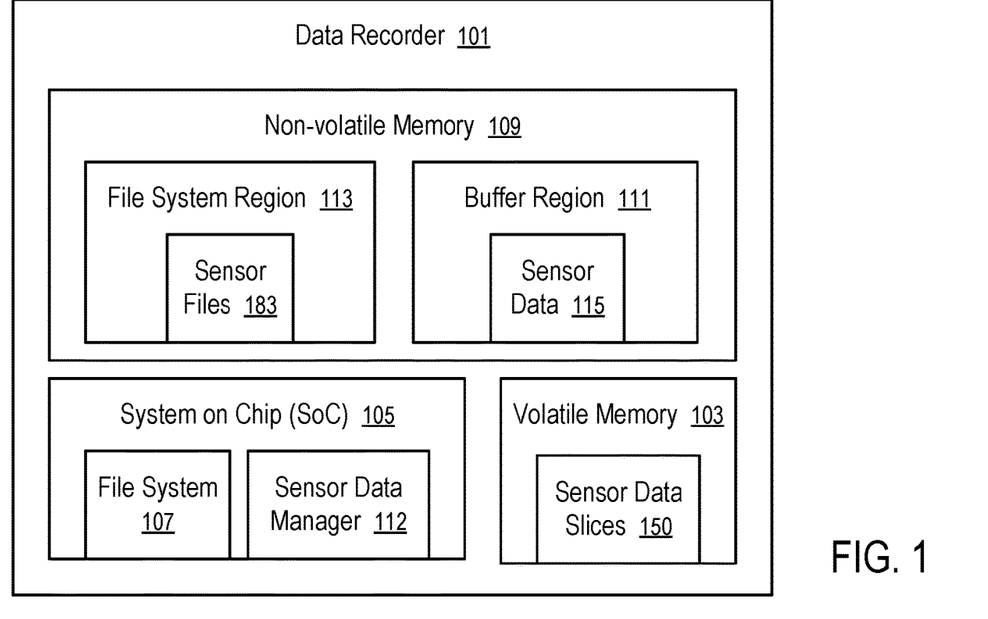
FIG. 1 shows a data recorder according to one embodiment.

FIG. 1 shows a data recorder 101 according to one embodiment.

The data recorder 101 of FIG. 1 includes a volatile memory 103, a non-volatile memory 109, and a System on Chip (SoC) 105. The non-volatile memory 109 is configured with a file system region 113 and a buffer region 111. The System on Chip (SoC) 105 implements a file system 107 mounted in a file system region 113 of the non-volatile memory 109. The System on Chip (SoC) 105 has a sensor data manager 112 configured to perform operations related to organizing sensor data in the data recorder 101, as discussed below in detail.

For example, the volatile memory 103 can include dynamic random access memory (DRAM) and/or synchronous dynamic random access memory (SDRAM); and the non-volatile memory 109 can include flash memory (e.g., NAND memory and/or NOR memory). The volatile memory 103 is more expensive than the non-volatile memory 109. The non-volatile memory 109 has a limited program erasure budget. After a number of cycles to erase the data from memory cells in the non-volatile memory 109 and program the memory cells to store data, the memory cells in the non-volatile memory 109 can become unreliable and thus reach the end of their useful life.

The data recorder 101 is configured to record sensor data 115 generated within a time period of a predetermined length (e.g., 30 seconds) prior to a triggering event. The volatile memory 103 is configured to buffer slices of the sensor data 115 generated in the time period of the predetermined length (e.g., 30 seconds). A sensor data slice 150 can include sensor data generated within a time slice (e.g., one second). The storage capacity of the volatile memory 103 is insufficient to hold the sensor data 115 for an entire time period of the predetermined length (e.g., 30 seconds). The sensor data slices 150 are flushed into the buffer region 111 in a cyclic way such that the most recent slice replaces the oldest slice to retain at least the sensor data 115 generated within the most recent time period of the predetermined length (e.g., 30 seconds).

In response to a triggering event, the System on Chip (SoC) 105 retrieves from the buffer region 111 the sensor data 115 that is generated within the most recent time period of the predetermined length (e.g., 30 seconds). The sensor data manager 112 stores the sensor data 115 into sensor files 183 organized under the file system 107.

For example, the sensor data manager 112 can organize data from different sensors into different files and append the data from the sensor data 115 associated with a triggering event into the respective files of the sensors. Alternatively, the sensor data manager 112 can organize data from different events into files and create a new file for the sensor data 115 associated with its triggering event. The file system 107 offers a flexible way to organize the sensor files 183 and a friendly way to access and retrieve sensor data 115 associated with triggering events.

The data structure and the meta data of the sensor files 183 organized under the file system 107 are generally not optimal for write operations in the non-volatile memory 109 and not optimal for the reduction of write amplification. For example, the erasure of a portion of sensor data stored in a file system can lead to the move of another portion of unrelated data in order to free a block of memory cells to be erased together. The average ratio of the number of write operations actual performed on memory cells to store data in a memory sub-system in a typical usage scenario and the number of write operations as requested to store the data is a measurement of write amplification. When the non-volatile memory 109 has a limited program erasure budget, elevated write amplification can reduce the endurance of the non-volatile memory 109 in servicing the write requests.

Figure 3:
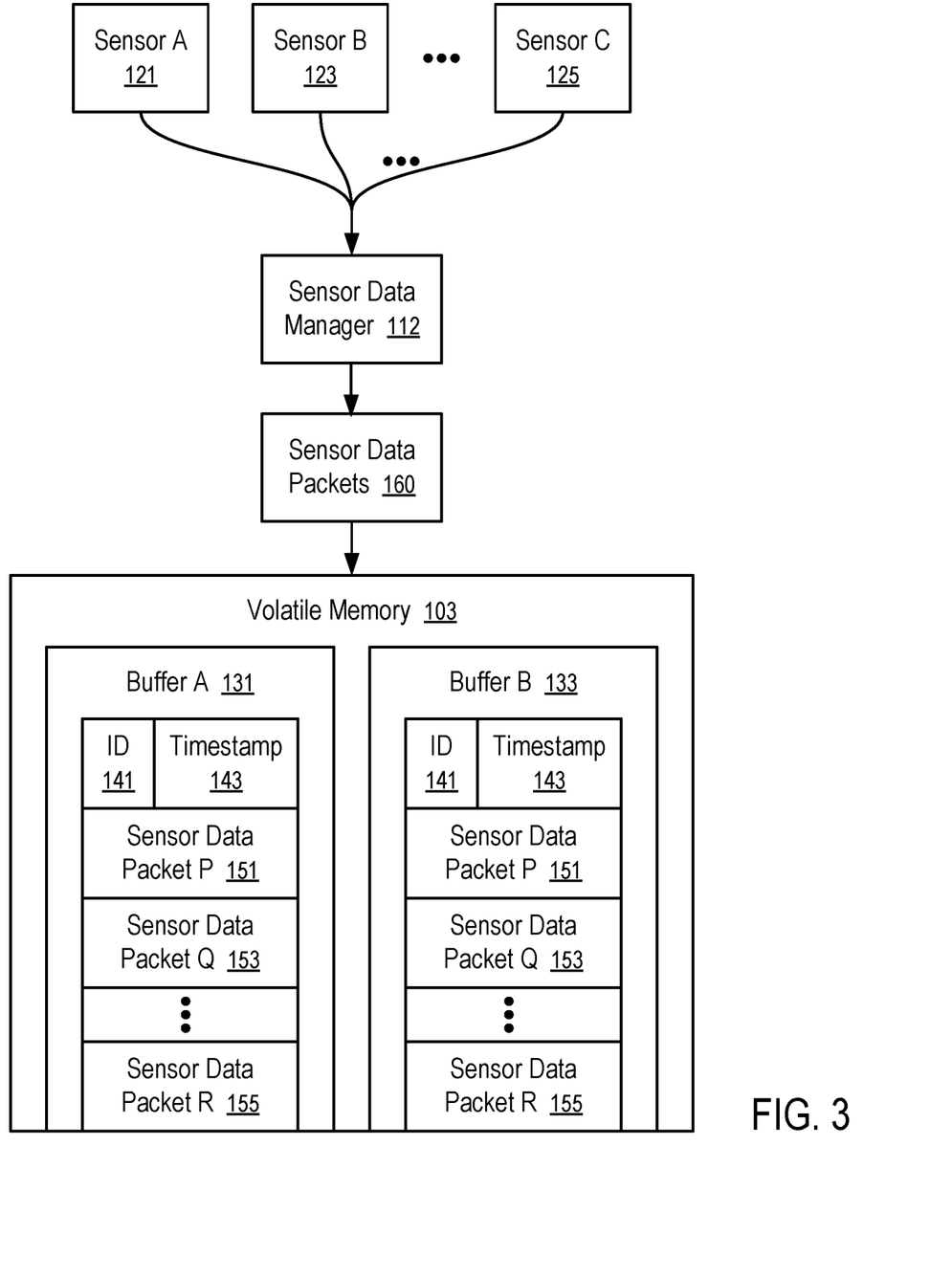
FIG. 3 shows a buffer configuration for a data recorder according to one embodiment.
Figure 4:
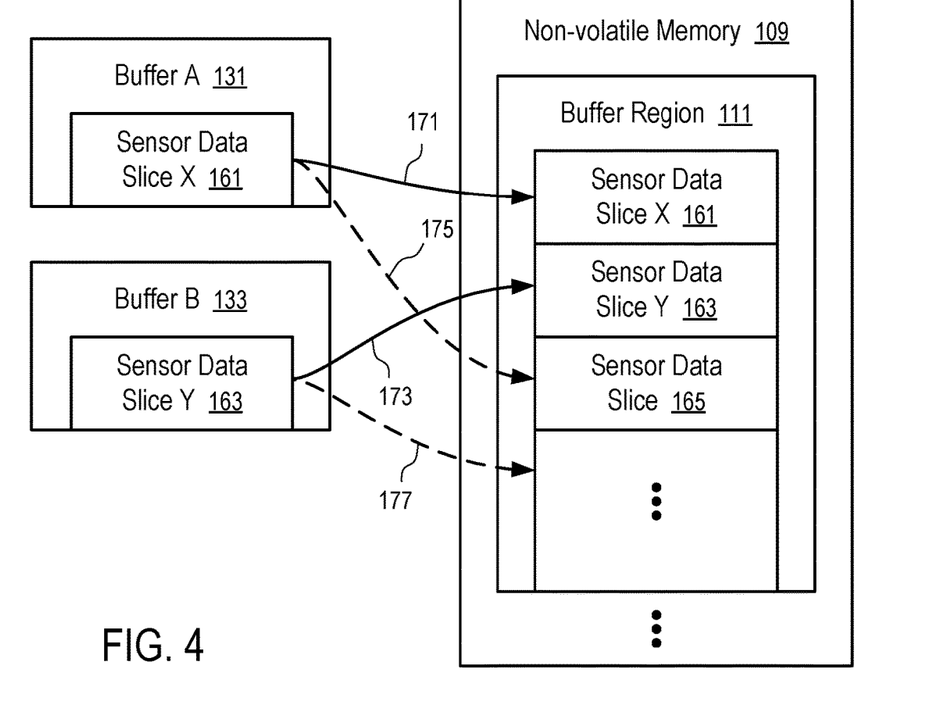
FIG. 4 illustrates flushing of data from buffers into a non-volatile memory according to one embodiment.

To reduce write amplification associated with the cyclical writing of the sensor data 115 in the non-volatile memory 109, the sensor data manager 112 organizes sensor data in slices 150 and stores the sensor data 115 in the buffer region 111 without using the file system 107 (e.g., as illustrated in FIGS. 3 and 4). In response to a triggering event (e.g., an accident or near accident), the sensor data manager 112 adds the sensor data 115 associated with the event to the sensor files 183 organized under the file system 107. Thus, the data recorder 101 provides enhanced access to sensor files 183 for events that have occurred, and reduces write amplifications for the cyclical buffering of sensor data 115 during operations when where is no triggering event.

In some implementations, the system on chip (Soc) 105 is replaced with one or more microprocessors configured via instructions of an operating system and/or application programs to implement the file system 107 and the sensor data manager 112. In some implementations, the sensor data manager 112 is implemented at least in part using a field programmable gate array (FPGA) or an application specific integrated circuit (ASIC). Thus, the implementation of the file system 107 and/or the sensor data manager 112 is not limited to a particular hardware and/or software configuration.

Figure 2:
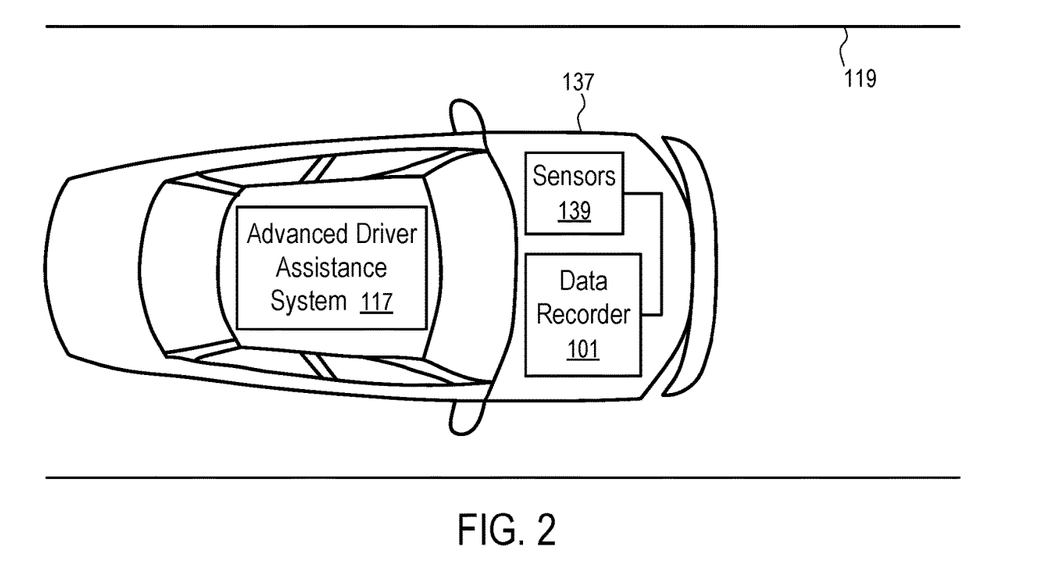
FIG. 2 shows a vehicle having a data recorder according to one embodiment.

FIG. 2 shows a vehicle 137 having a data recorder 101 according to one embodiment. For example, the data recorder 101 of FIG. 1 can be used in the vehicle 137 of FIG. 2.

In FIG. 2, the vehicle 137 has a set of sensors 139, a data recorder 101, and an advanced driver assistance system 117.

For example, the sensors 139 can include digital cameras, lidars, radars, ultrasound sonars, brake sensors, speed sensors, acceleration sensors, airbag sensors, a GPS (global positioning system) receiver, audio sensors/microphones, vibration sensors, force/stress sensors, deformation sensors, motion sensors, temperature sensors, etc.

For example, some of the sensors 139 can be configured primarily to monitor the environment of the vehicle 137; and other sensors 139 can be configured primarily to monitor the operating condition of one or more components of the vehicle 137, such as an internal combustion engine, an exhaust system, an electric motor, a brake, a tire, a battery, etc.

The advanced driver assistance system 117 can use an Artificial Neural Network (ANN) to analyze the sensor data 115 generated by the sensors 139 to assist a driver of the vehicle 137. For example, the advanced driver assistance system 117 can perform adaptive cruise control (ACC), automatic parking, blind spot monitoring, collision avoidance, crosswind stabilization, driver monitoring, forward collision warning, lane departure warning, lane change assistance, traffic sign recognition, wrong-way driving warning, and/or autonomous driving.

In general, the outputs of the sensors 139 as a function of time are provided as a sensor data stream to the advanced driver assistance system 117 and the data recorder 101. Different sensors 139 can output sensor data at different rates during operation of the vehicle 137 on a roadway 119.

Figure 5:
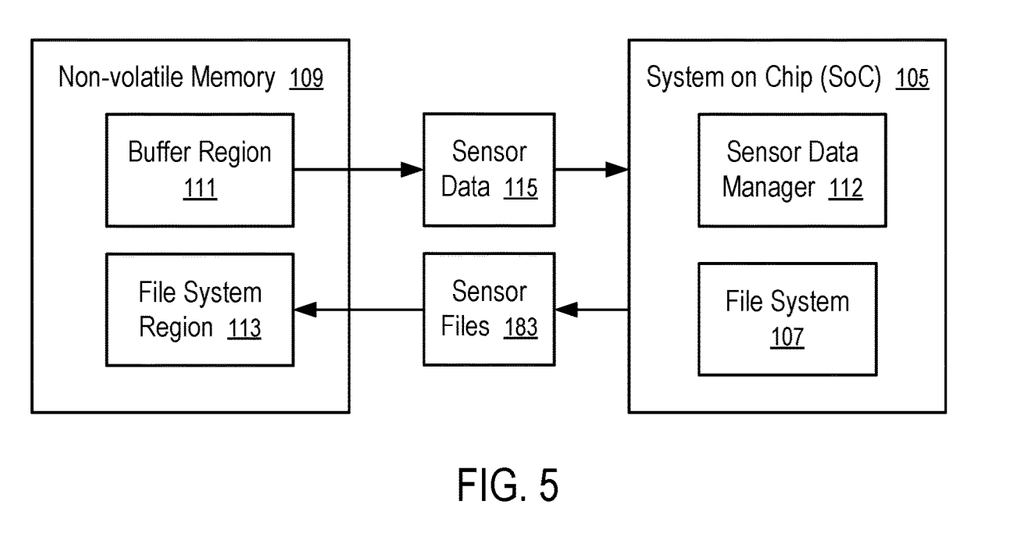
FIG. 5 shows the conversion of sensor data into sensor files in a data recorder according to one embodiment.

The outputs of the sensors 139 to the data recorder 101 are initially buffered in the volatile memory 103 of the data recorder 101 to form sensor data slices 150, as illustrated in FIG. 3. The sensor data slices 150 are flushed into the buffer region 111 in a cyclic manner as illustrated in FIG. 4. In response to a triggering event, the sensor data 115 associated with the event is retrieved from the buffer region 111 and stored into sensor files 183 organized under the file system 107, as illustrated in FIG. 5.

FIG. 3 shows a buffer configuration for a data recorder 101 according to one embodiment. For example, the buffer configuration of FIG. 3 can be used in the data recorder 101 of FIGS. 1 and/or 2.

In FIG. 3, the sensor data manager 112 organizes the output of sensors 121, 123, . . . , 125 into a stream of sensor data packets 160.

Each sensor data packet (e.g., 151, 153, . . . , or 155) is used for data from one sensor (e.g., 121, 123, . . . , or 125).

The sensor data packets (e.g., 151, 153, . . . , or 155) are configured to have a same size (e.g., having a predetermined number of bytes).

The volatile memory 103 is configured to form two buffers 131 and 133 that can be used in parallel. Each of the buffers 131 and 133 is used to store a sensor data slice. When one of the buffers (e.g., 131) is used to receive incoming sensor data packets 160 to form a sensor data slice, the sensor data slice in the other buffer (e.g., 133) can be read and written into the buffer region 111 of the non-volatile memory 109.

Each sensor data slice (e.g., stored in buffer 131 or 133) can have an identification 141 and a timestamp 143 identifying the date and time of the sensor data slice.

Each sensor data slice can include the output generated by the sensors 121, 123, . . . , 125 in one or more cycles. Each cycle is configured to store a predetermined numbers of packets for the set of sensors 121, 123, . . . , 125. Based on the data output rates of the sensors 121, 123, . . . , 125, different sensors can be assigned to use different numbers of packets in a cycle. The ordering of the packets from different sensors 121, 123, . . . , 125 in the sequence of packets 151, 153, . . . , 155 in a cycle can be identified by a schedule maintained in the sensor data manager 112 such that it is not necessary to store data in the buffer 131 or 133 (and thus the sensor data slice) to identify which data packet is from which sensor and at what time relative to the timestamp 143 of the sensor data slice. The schedule can be optimized to reduce unused storage space allocated for the recording of the sensor data in a cycle; and a buffer (e.g., 131 or 133) can be configured to store sensor data for one or more cycles. The size of a buffer can be configured to be aligned with the size of a block of Logical Block Addressing (LBA) accessing the non-volatile memory 109 and the size of an erasure block in the non-volatile memory 109. An erasure block contains a set of memory cells that are to be erased together in one erase operation; and when a portion of the memory cells is to be erased, the remaining cells in the erasure block are also subjected to the erasure operation.

For example, the size of the buffer 131 or 133 can be configured to be the same as, or the multiple of, the size of a LBA block addressable to write a block of data into the non-volatile memory 109, and the size of erasure blocks of the non-volatile memory 109.

The buffer configuration of FIG. 3 reduces the meta data used to specify the organization of data within each sensor data slice and align the sensor data slice with the block erasing and writing boundaries to minimize write amplification (e.g., in comparison with the storing of sensor data via the file system 107).

FIG. 4 illustrates flushing of data from buffers into a non-volatile memory according to one embodiment. For example, the technique of FIG. 4 can be implemented in the data recorder 101 of FIGS. 1 and 2 using a buffer configuration illustrated in FIG. 3.

In FIG. 4, the sensor data manager 112 of the data recorder 101 fills outputs from sensors 121, 123, . . . , 125 into the buffer 131 to create a sensor data slice 161. When the buffer 131 is full, the sensor data slice 161 is available; and in response, the sensor data manager 112 fills outputs from sensors 121, 123, . . . , 125 into the buffer 133 to create a subsequent sensor data slice 163. Each of the sensor data slices 161 and 163 can have the structure illustrated in FIG. 3 to reduce write amplification and for optimized performance in writing the sensor data slices into the non-volatile memory 109.

While the sensor data manager 112 is filling outputs from sensors 121, 123, . . . , 125 into the buffer 133, the sensor data manager 112 can concurrently flush the sensor data slice 161 into a slot in the buffer region 111 of the non-volatile memory 109.

For example, the buffer region 111 can be configured as a namespace allocated on a portion of the non-volatile memory 109; and the sensor data manager 112 can use a Non-Volatile Memory Express (NVMe) protocol to access the storage capacity offered in the namespace using LBA addresses. In some implementations, the non-volatile memory 109 is configured in a solid state driver (SSD) having a host interface to a processor (e.g., System on Chip (SoC) 105).

For example, the slot used to store 171 the sensor data slice 161 in the buffer region 111 can be identified by an LBA address in the namespace. A subsequent LBA address can be used to identify the slot used to store 173 the sensor data slice 163 generated in the buffer 133.

While flushing the data from the buffer 133 into the buffer region 111, the sensor data manager 112 can reuse the buffer 131 to create the next sensor data slice 165, which can be stored 175 into the buffer region 111 at the next LBA address when the buffer 133 is again used to create a further sensor data slice to be stored 177 into the buffer region 111.

The buffer region 111 is configured with a storage capacity sufficient to store the sensor data 115 generated in the most recent time period of a predetermined length (e.g., 30 seconds). When the buffer region 111 is full, the lowest LBA address in the namespace configured for the buffer region 111 contains the oldest slice, which can be erased and freed to store the most recent slice from the buffer 131 or 133. Then, the next LBA address contains the oldest slice, which can be erased to store the incoming slice.

For example, each slice can be configured to store sensor data generated in one second; and the buffer region 111 can have a storage capacity for thirty or more slices such that the most recent 30 seconds of sensor data can be found in the buffer region 111.

A triggering event can be identified via a signal from a sensor indicative of an impact, or a notification from the advanced driver assistance system 117 indicating an accident or near accident.

In response to the triggering event, the sensor data manager 112 can save the sensor data 115 into a file system region 113 to free up the buffer region 111 for subsequent operations to capture the sensor data associated with the next event, as illustrated in FIG. 5.

FIG. 5 shows the conversion of sensor data 115 into sensor files 183 in a data recorder 101 according to one embodiment. For example, the technique of FIG. 5 can be implemented in the data recorder 101 of FIGS. 1 and 2 using a buffer region 111 configured according to FIG. 4.

In FIG. 5, a non-volatile memory 109 is configured to include a buffer region 111 and a file system region 113. Optionally, the non-volatile memory 109 can further include a region allocated for the operation of the advanced driver assistance system 117 and/or another sub-system of the vehicle 137, such as an infotainment system.

For example, each of the regions (e.g., 111, 113) can be configured as a namespace accessible via LBA address within the namespace using an NVMe protocol.

In response to a triggering event, the sensor data manager 112 reads the sensor data 115 from the buffer region 111 and writes sensor files 183 into the file system region 113 in which the file system 107 is mounted.

For example, the sensor data 115 can be appended to files configured to record sensor data of individual sensors 121, 123, . . . , 125. For example, new files can be generated to store outputs of the sensors 121, 123, . . . , 125 for the triggering event. For example, separate folders or directories can be created in the file system 107 for the outputs of the sensors 121, 123, . . . , 125; and outputs collected from the sensors 121, 123, . . . , 125 for different events can be organized as separate files under the respective folders or directories of the sensors 121, 123, . . . , 125. Alternatively, different folders or directories can be created in the file system 107 for different events; and separate files can be created under a folder or directory of an event to store outputs from the different sensors 121, 123, . . . , 125 leading to the event.

Figure 6:
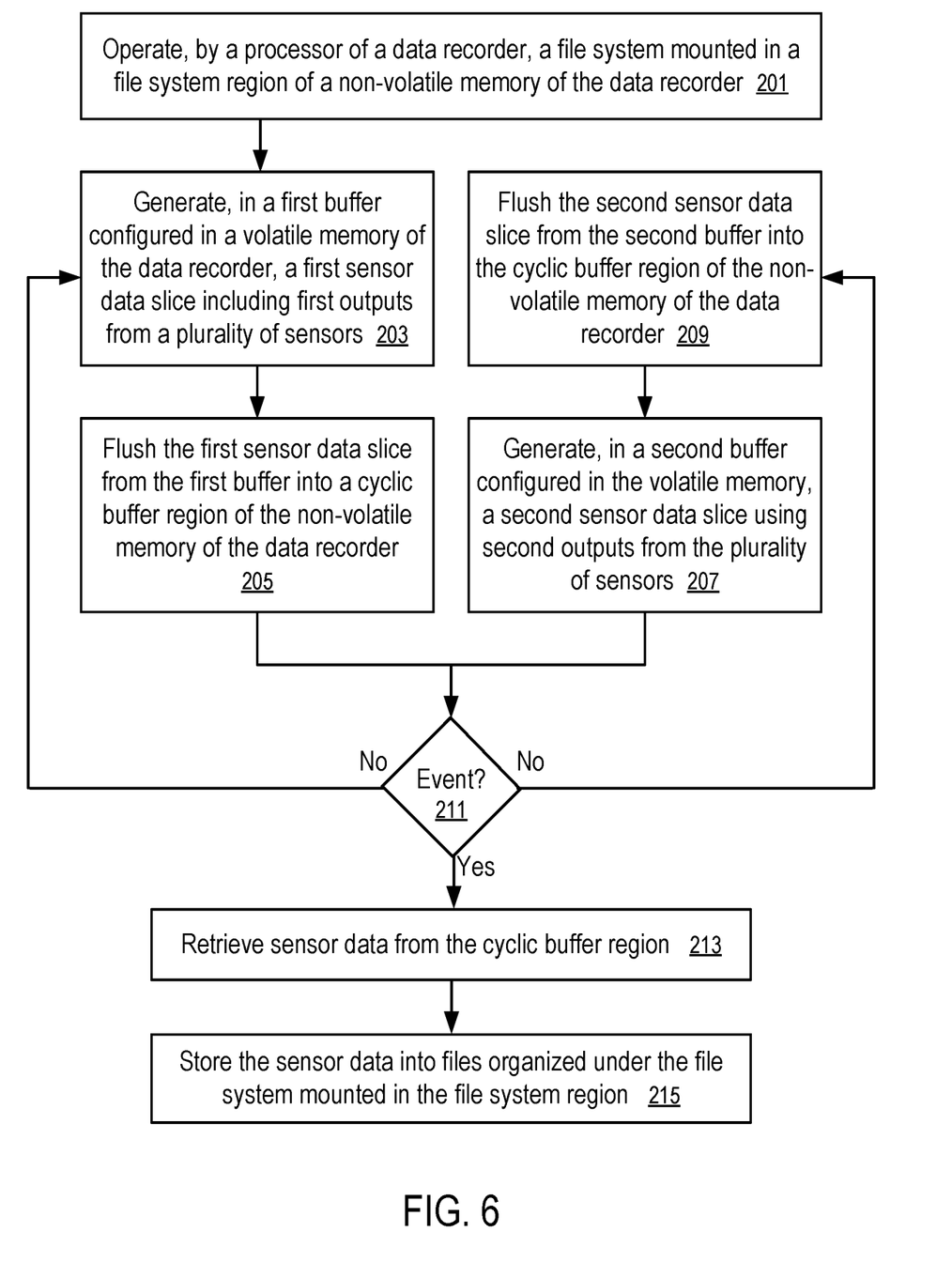
FIG. 6 shows a method to store sensor data in a data recorder according to one embodiment.

FIG. 6 shows a method to store outputs from sensors 139 in a data recorder 101 according to one embodiment. For example, the method of FIG. 6 can be implemented in the data recorder 101 illustrated in FIGS. 1 and/or 2 using a sensor data manager 112 performing operations illustrated in FIGS. 3 to 5.

At block 201, a processor of a data recorder 101 operates a file system 107 mounted in a file system region 113 of a non-volatile memory 109 of the data recorder 101.

For example, the processor can be a System on chip (SoC) 105; and the non-volatile memory includes a flash memory, such as a NAND flash memory or a NOR flash memory.

For example, the data recorder 101 can include a solid state drive (SSD) that provides a storage capacity via the non-volatile memory 109. The solid state driver (SSD) includes a host interface implementing a non-volatile memory express (NVMe) protocol for communication with the processor.

At block 203, the data recorder 101 generates, in a first buffer 131 configured in a volatile memory 103 of the data recorder 101, a first sensor data slice 161 including first outputs from a plurality of sensors 139.

For example, the volatile memory 103 includes a dynamic random access memory (DRAM) and/or a static random access memory (SRAM). The volatile memory 103 is configured into two buffers 131 and 133 that can be used in parallel.

For example, the sensors 139 can be configured on a vehicle 137 to provide a stream of sensor data 115 to an advanced driver assistance system 117 of the vehicle 137. While the advanced driver assistance system 117 consumes the stream of sensor data 115 on the fly for the operation of the vehicle 137, the data recorder 101 is configured to preserve a segment of the sensor data stream just before an event of interest, such as an accident or near accident.

The sensors 139 can have a sensor 121, another sensor 123, and a further sensor 125, which generate outputs at different data rates.

The processor of the data recorder 101 is configured to receive outputs from the sensors 139, generate sensor data packets 151, 153, . . . , 155, and write/fill the sensor data packets 151, 153, . . . , 155 into the first buffer 131 in the volatile memory 103 to form the first sensor data slice 161.

For example, each sensor data slice (e.g., 161 or 163) can include an identification 141 and a timestamp 143. Each sensor data packet (e.g., 151, 153, . . . , 155) is configured to have a predetermined size and hold data from just one of the sensors 139. Each sensor data slice (e.g., 161 or 163) has a predetermined structure that indicates which sensor data packet is from which sensor and generated at what time relative to the timestamp 143 of the sensor data slice. Thus, no data is configured in the sensor data slice to indicate the structure and/or organization of the sensor data packets. The schema or schedule of the structure can be maintained in the processor of the data recorder 101 and adjusted from time to time to balance the allocation of packages to different sensors 121, 123, . . . , 125 according to their current rates of output sensor data to maximize the utilization of a sensor data slice.

When the first buffer 131, the operations in blocks 205 and 207 can be performed in parallel.

At block 205, the data recorder 101 flushes the first sensor data slice 161 from the first buffer into a cyclic buffer region 111 of the non-volatile memory 109 of the data recorder 101.

At block 207, the data recorder 101 generates, in a second buffer 133 configured in the volatile memory 103, a second sensor data slice 163 using second outputs from the plurality of sensors 139.

For example, while the buffer 131 is used in reading the sensor data slice 161 to store 171 it into the cyclic buffer region 111, the buffer 133 can be written into to form the second sensor data slice 163.

At block 211, a determination is made whether an event of interest has occurred.

For example, when an impact sensor detects a signal, a command is generated to request the data recorder 101 to preserve the sensor data slices (e.g., 161, 163, . . . ) in the cyclic buffer region 111.

For example, when the advanced driver assistance system 117 detects an event of an accident or near accident based on an analysis of the outputs from the sensors 139, a command can be sent to the data recorder 101 to the sensor data slices (e.g., 161, 163, . . . ) in the cyclic buffer region 111.

In absence of an event of interest, the operations in blocks 203 and 209 can be performed in parallel.

At block 209, the data recorder 101 flushes the second sensor data slice 163 from the second buffer 133 into the cyclic buffer region 111 of the non-volatile memory 109 of the data recorder 101. At the same time, the data recorder 101 can generate a further sensor data slice 165 in the first buffer 131.

For example, while the buffer 133 is used in reading the sensor data slice 163 to store 173 it into the cyclic buffer region 111, the buffer 131 can be written into to form the further sensor data slice 165.

For example, the cyclic buffer region 111 is configured with a storage capacity having than two slots. Each slot is suitable for storing one sensor data slice (e.g., 161, 163, or 165). An incoming sensor data slice flushed from the buffers 131 or 133 can be stored into a next available/empty slot. When the cyclic buffer region 111 is full, the content in the slot storing the oldest slice is erased to provide an available/empty slot for the next incoming sensor data slice.

For example, the cyclic buffer region 111 and the file system region 113 can be each allocated as a separate namespace in a storage capacity of the non-volatile memory 109 in a solid state drive (SSD). The location of each of the slots in the cyclic buffer region 111 can be addressed using a Logical Block Addressing (LBA) address in the namespace of the cyclic buffer region 111. For example, a write command can be sent from the processor of the data recorder 101 to the solid state drive (SSD) according to a non-volatile memory express (NVMe) protocol using the LBA address to store a sensor data slice (e.g., 161) into a slot in the cyclic buffer region 111. The size of each of the buffers 131 and 133 and thus the size of each sensor data slice (e.g., 161, 163, 165) can be configured to be aligned with (e.g., the same as or the multiple of) the storage size of a block addressable via an LBA address in the namespace of the cyclic buffer region 111 to minimize unused space and/or write amplification.

The file system 107 can also send write commands to the solid state drive (SSD) using LBA addresses. Since data items used in the file system 107 are generally not aligned with the block boundaries of LBA addresses, the write operations of the file system 107 have elevated write amplification. Further, requests for random writes can reduce the write performance of the solid state drive (SSD). However, the file structure provided by the file system 107 offers enhanced and/or user friendly access to the preserved sensor data 115 associated with events of interest.

The use of the structure of sensor data slices in the buffer region 111 avoids the use of the file system 107 in buffering the most recent set of sensor data 115 in the non-volatile memory 109 and thus reduces write amplification associated with the operations of the file system 107 and performance impact on writes on buffering the sensor data 115.

If, at block 211, an event of interest is detected, the processor of the data recorder 101 retrieves, at block 213, sensor data 115 from the cyclic buffer region 111, and stores, at block 215, the sensor data 115 into files 183 organized under the file system 107 mounted in the file system region 113.

The solid state driver and/or at least a portion of the data recorder 101 can be implemented as a memory sub-system.

In general, a memory sub-system can be used as a storage device and/or a memory module. Examples of storage devices, memory modules, and memory devices are described below in conjunction with FIG. 7. A host system can utilize a memory sub-system that includes one or more components, such as memory devices that store data. The host system can provide data to be stored at the memory sub-system and can request data to be retrieved from the memory sub-system.

Figure 7:
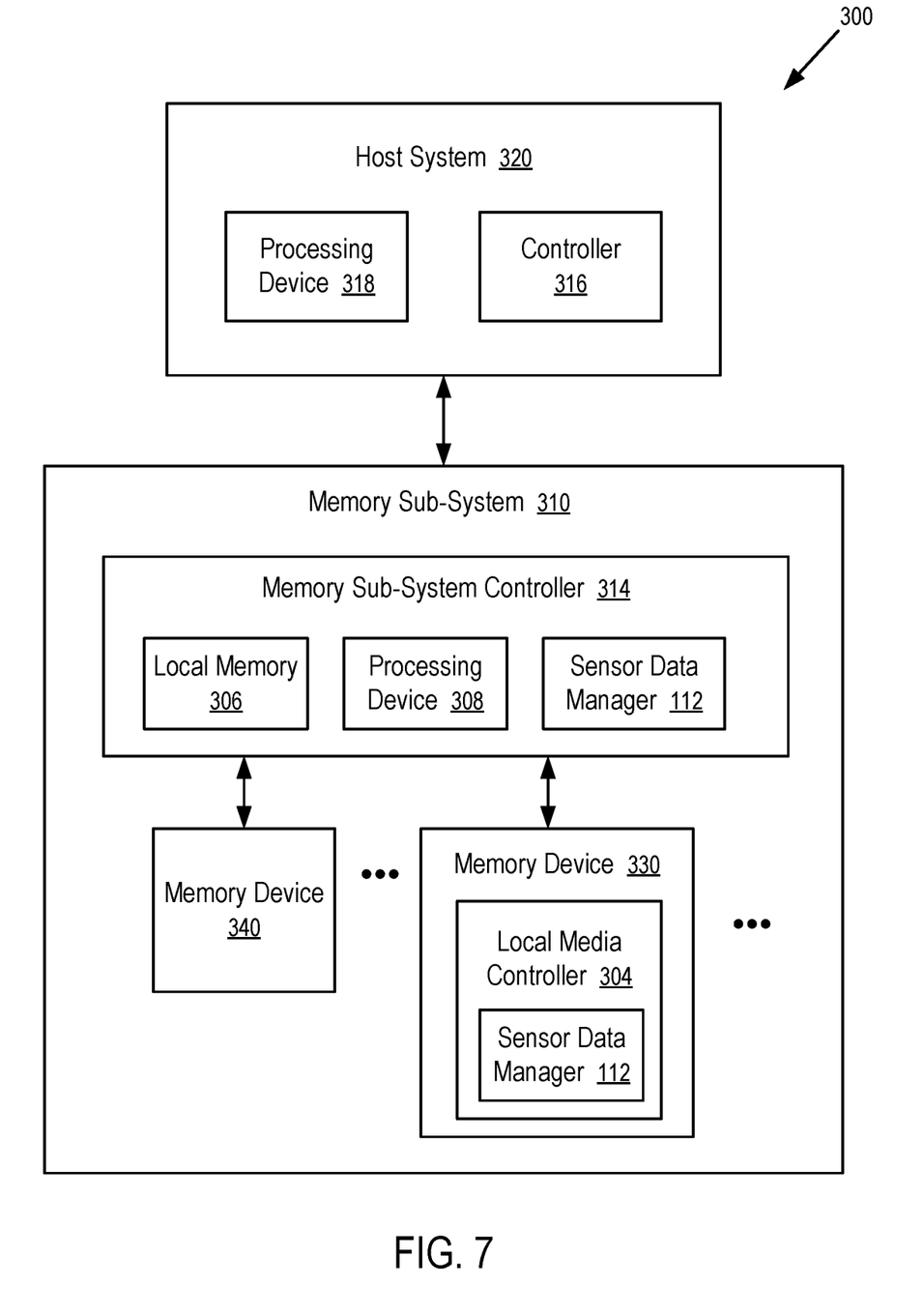
FIG. 7 illustrates an example computing system having a memory sub-system in accordance with some embodiments of the present disclosure.

FIG. 7 illustrates an example computing system 300 that includes a memory sub-system 310 in accordance with some embodiments of the present disclosure. The memory sub-system 310 can include media, such as one or more volatile memory devices (e.g., memory device 340), one or more non-volatile memory devices (e.g., memory device 330), or a combination of such.

A memory sub-system 310 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 300 can be a computing device such as a data recorder, a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 300 can include a host system 320 that is coupled to one or more memory sub-systems 310. FIG. 7 illustrates one example of a host system 320 coupled to one memory sub-system 310. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 320 can include a processor chipset (e.g., processing device 318) and a software stack executed by the processor chipset. The processor chipset can include one or more cores, one or more caches, a memory controller (e.g., controller 316) (e.g., NVDIMM controller), and a storage protocol controller (e.g., PCIe controller, SATA controller). The host system 320 uses the memory sub-system 310, for example, to write data to the memory sub-system 310 and read data from the memory sub-system 310.

The host system 320 can be coupled to the memory sub-system 310 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 320 and the memory sub-system 310. The host system 320 can further utilize an NVM Express (NVMe) interface to access components (e.g., memory devices 330 of FIG. 1) when the memory sub-system 310 is coupled with the host system 320 by the PCIe interface. The physical host interface can provide an interface for passing control, address, data, and other signals between the memory sub-system 310 and the host system 320. FIG. 7 illustrates a memory sub-system 310 as an example. In general, the host system 320 can access multiple memory sub-systems via a same communication connection, multiple separate communication connections, and/or a combination of communication connections.

The processing device 318 of the host system 320 can be, for example, a microprocessor, a central processing unit (CPU), a processing core of a processor, an execution unit, etc. In some instances, the controller 316 can be referred to as a memory controller, a memory management unit, and/or an initiator. In one example, the controller 316 controls the communications over a bus coupled between the host system 320 and the memory sub-system 310. In general, the controller 316 can send commands or requests to the memory sub-system 310 for desired access to memory devices 330, 340. The controller 316 can further include interface circuitry to communicate with the memory sub-system 310. The interface circuitry can convert responses received from memory sub-system 310 into information for the host system 320.

The controller 316 of the host system 320 can communicate with controller 314 of the memory sub-system 310 to perform operations such as reading data, writing data, or erasing data at the memory devices 330, 340 and other such operations. In some instances, the controller 316 is integrated within the same package of the processing device 318. In other instances, the controller 316 is separate from the package of the processing device 318. The controller 316 and/or the processing device 318 can include hardware such as one or more integrated circuits (ICs) and/or discrete components, a buffer memory, a cache memory, or a combination thereof. The controller 316 and/or the processing device 318 can be a microcontroller, special purpose logic circuitry (e.g., a field programmable gate array (FPGA), an application specific integrated circuit (ASIC), etc.), or another suitable processor.

The memory devices 330, 340 can include any combination of the different types of non-volatile memory components and/or volatile memory components. The volatile memory devices (e.g., memory device 340) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 330 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 330 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 330 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 330 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 314 (or controller 314 for simplicity) can communicate with the memory devices 330 to perform operations such as reading data, writing data, or erasing data at the memory devices 330 and other such operations (e.g., in response to commands scheduled on a command bus by controller 316). The controller 314 can include hardware such as one or more integrated circuits (ICs) and/or discrete components, a buffer memory, or a combination thereof. The hardware can include digital circuitry with dedicated (e.g., hard-coded) logic to perform the operations described herein. The controller 314 can be a microcontroller, special purpose logic circuitry (e.g., a field programmable gate array (FPGA), an application specific integrated circuit (ASIC), etc.), or another suitable processor.

The controller 314 can include a processing device 308 (e.g., processor) configured to execute instructions stored in a local memory 306. In the illustrated example, the local memory 306 of the controller 314 includes an embedded memory configured to store instructions for performing various processes, operations, logic flows, and routines that control operation of the memory sub-system 310, including handling communications between the memory sub-system 310 and the host system 320.

In some embodiments, the local memory 306 can include memory registers storing memory pointers, fetched data, etc. The local memory 306 can also include read-only memory (ROM) for storing micro-code. While the example memory sub-system 310 in FIG. 7 has been illustrated as including the controller 314, in another embodiment of the present disclosure, a memory sub-system 310 does not include a controller 314, and can instead rely upon external control (e.g., provided by an external host, or by a processor or controller separate from the memory sub-system).

In general, the controller 314 can receive commands or operations from the host system 320 and can convert the commands or operations into instructions or appropriate commands to achieve the desired access to the memory devices 330. The controller 314 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 330. The controller 314 can further include host interface circuitry to communicate with the host system 320 via the physical host interface. The host interface circuitry can convert the commands received from the host system into command instructions to access the memory devices 330 as well as convert responses associated with the memory devices 330 into information for the host system 320.

The memory sub-system 310 can also include additional circuitry or components that are not illustrated. In some embodiments, the memory sub-system 310 can include a cache or buffer (e.g., DRAM) and address circuitry (e.g., a row decoder and a column decoder) that can receive an address from the controller 314 and decode the address to access the memory devices 330.

In some embodiments, the memory devices 330 include local media controllers 304 that operate in conjunction with memory sub-system controller 314 to execute operations on one or more memory cells of the memory devices 330. An external controller (e.g., memory sub-system controller 314) can externally manage the memory device 330 (e.g., perform media management operations on the memory device 330). In some embodiments, a memory device 330 is a managed memory device, which is a raw memory device combined with a local controller (e.g., local media controller 304) for media management within the same memory device package. An example of a managed memory device is a managed NAND (MNAND) device.

The controller 314 and/or a memory device 330 can include a sensor data manager 112, such as the sensor data manager 112 discussed above in connection with FIGS. 1 to 6. In some embodiments, the controller 314 in the memory sub-system 310 includes at least a portion of the sensor data manager 112. In other embodiments, or in combination, the controller 316 and/or the processing device 318 in the host system 320 includes at least a portion of the sensor data manager 112. For example, the controller 314, the controller 316, and/or the processing device 318 can include logic circuitry implementing the sensor data manager 112. For example, the controller 314, or the processing device 318 (e.g., processor) of the host system 320, can be configured to execute instructions stored in memory for performing the operations of the sensor data manager 112 described herein. In some embodiments, the sensor data manager 112 is implemented in an integrated circuit chip (e.g., memory device 330) installed in the memory sub-system 310. In other embodiments, the sensor data manager 112 can be part of firmware of the memory sub-system 310, an operating system of the host system 320, a device driver, or an application, or any combination therein.

Figure 8:
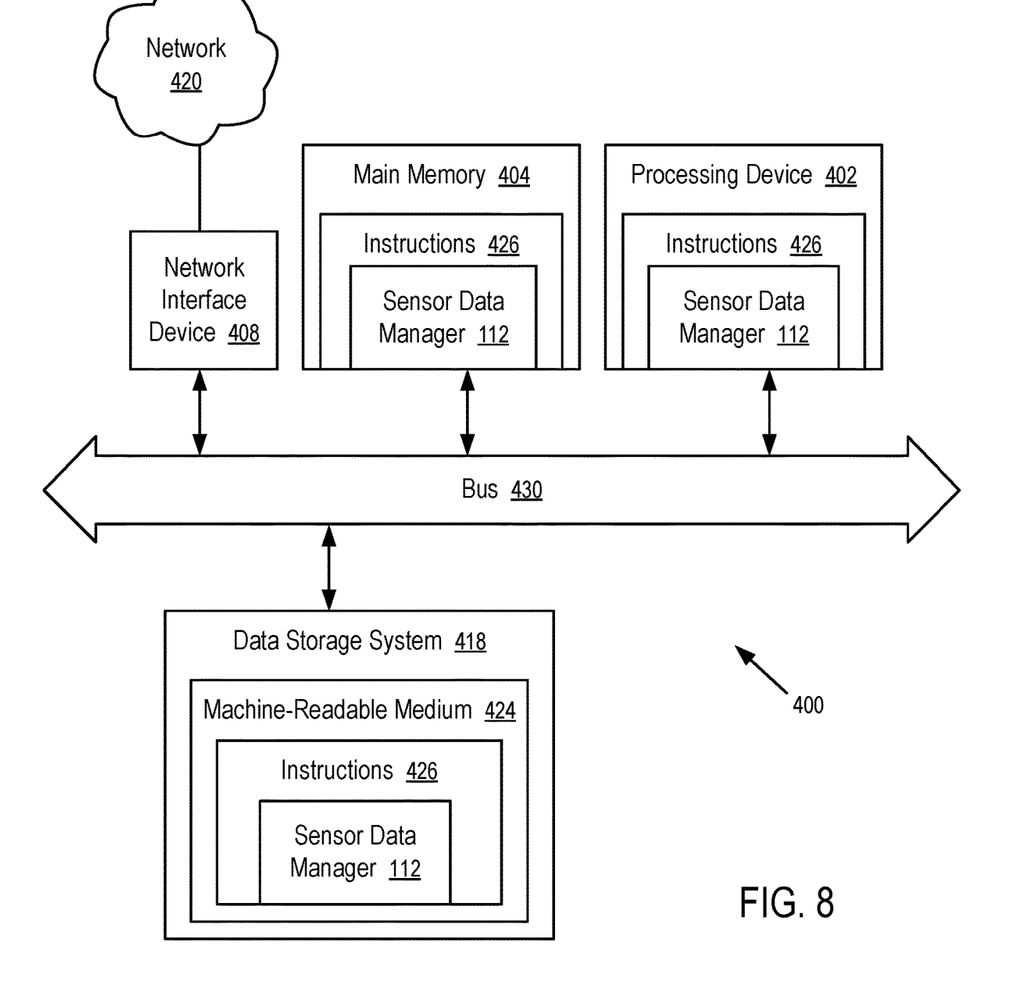
FIG. 8 is a block diagram of an example computer system in which embodiments of the present disclosure can operate.

FIG. 8 illustrates an example machine of a computer system 400 within which a set of instructions, for causing the machine to perform any one or more of the methodologies discussed herein, can be executed. In some embodiments, the computer system 400 can correspond to a host system (e.g., the host system 320 of FIG. 7) that includes, is coupled to, or utilizes a memory sub-system (e.g., the memory sub-system 310 of FIG. 7) or can be used to perform the operations of a sensor data manager 112 (e.g., to execute instructions to perform operations corresponding to the sensor data manager 112 described with reference to FIGS. 1-6). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 310 of FIG. 7.

In one embodiment, the instructions 426 include instructions to implement functionality corresponding to a sensor data manager 112 (e.g., the sensor data manager 112 described with reference to FIGS. 1-6). While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
   sensors of an advanced driver assistance system; and
   a data recorder, having
   a volatile memory;
   a non-volatile memory configured with a file system region and a buffer region; and
   a processor configured to implement a file system mounted in the file system region, wherein the data recorder is configured to:
   record outputs from the sensors via the volatile memory into the buffer region in a cyclic way, wherein the outputs from the sensors are passed from the volatile memory to the buffer region in the non-volatile memory, and wherein the outputs from the sensors are stored in the buffer region as sensor data slices; and
   in response to an event, retrieve at least one of the sensor data slices from the buffer region and store the at least one of the sensor data slices into files organized under the file system mounted in the file system region,
   wherein the buffer region has a capacity to store more than two sensor data slices of the sensor data slices; wherein each respective sensor data slice of the sensor data slices has a predetermined size and a structure identified by a schedule specifying a predetermined number of sensor data packets to include in each sensor data slice of the sensor data slices, the sensors that provide the sensor data packets, and timing of generation of the sensor data packets relative to a timestamp of the respective sensor data slice.

2. The system of claim 1, wherein the processor includes a system on chip; the volatile memory includes a dynamic random access memory; and the non-volatile memory includes a flash memory.

3. The system of claim 1, wherein the processor is configured to receive the outputs from the sensors and generate the sensor data packets written into the volatile memory as the sensor data slices.

4. The system of claim 3, wherein the volatile memory is configured into a first buffer and a second buffer; and the processor is configured to fill first sensor data packets into the first buffer to generate a first sensor data slice of the sensor data slices and then fill second data packets into the second buffer to generate a second sensor data slice of the sensor data slices.

5. The system of claim 4, wherein each of the first sensor data slice and the second sensor data slice includes an identification and the timestamp.

6. The system of claim 5, wherein concurrently with filling the second data packets into the second buffer as the second sensor data slice, the processor is configured to read the first sensor data slice from the first buffer and write the first sensor data slice into the buffer region in the non-volatile memory.

7. The system of claim 6, wherein the buffer region is identified via a namespace allocated in the non-volatile memory; and a location to write the first sensor data slice in the non-volatile memory is identified via an address of logical block addressing in the namespace.

8. The system of claim 7, further comprising:
   a solid state drive having the non-volatile memory and a host interface, the host interface implementing a non-volatile memory express protocol for communication with the processor.

9. The system of claim 8, wherein a size of the first sensor data slice is configured to be aligned with a block size of memory addressable via the logical block addressing in the namespace.

10. A device, comprising:
    a volatile memory;
    a non-volatile memory partitioned into a plurality of regions, including a file system region and a buffer region; and a processor configured to:
  operate a file system mounted in the file system region;
  organize outputs from a plurality of sensors into sensor data packets in the volatile memory, each sensor data packet having data from one of the plurality of sensors;
  store the sensor data packets from the volatile memory in the buffer region in a cyclic way, wherein the sensor data packets are passed from the volatile memory to the buffer region in the non-volatile memory, and wherein the outputs from the sensors are stored in the buffer region as sensor data slices; and
  in response to an event, retrieve at least one of the sensor data slices from the buffer region and store the at least one of the sensor data slices into files organized under the file system mounted in the file system region,
  wherein the buffer region has a capacity to store more than two sensor data slices of the sensor data slices; wherein each respective sensor data slice of the sensor data slices has a predetermined size and a structure identified by a schedule specifying a predetermined number of the sensor data packets, the plurality of sensors that provide the sensor data packets, and timing of generation of the sensor data packets relative to a timestamp of the respective sensor data slice.

11. The device of claim 10, wherein the non-volatile memory is configured in a solid state drive; and the processor is configured to read the sensor data from the buffer region and write the files using a non-volatile memory express (NVMe) protocol.

12. The device of claim 11, wherein the processor includes a system on chip; the volatile memory includes a dynamic random access memory; and the non-volatile memory includes a flash memory.

13. The device of claim 12, wherein the volatile memory is configured to provide a first buffer and a second buffer operable in parallel; when the first buffer is being written into to generate a first sensor data slice of the sensor data slices, the second buffer is readable in parallel to write a second sensor data slice of the sensor data slices into the buffer region in the non-volatile memory.

14. The device of claim 13, wherein the file system region and the buffer region are configured as two namespaces allocated from the non-volatile memory; and the processor is configured to identify a location to write the sensor data slice from one of the first buffer and the second buffer in a namespace of the buffer region at the location identified using an address of logical block addressing.

15. The device of claim 13, wherein each of the first buffer and the second buffer is configured to have a storage capacity for the sensor data slice, wherein the sensor data slice has a size that is a multiple of a block size of memory addressable using a logical block addressing in a namespace of the buffer region and multiple of an erasure block size of the non-volatile memory.

16. A method, comprising:
operating, by a processor of a data recorder, a file system mounted in a file system region of a non-volatile memory of the data recorder;
generating, in a first buffer configured in a volatile memory of the data recorder, a first sensor data slice including first outputs from a plurality of sensors;
flushing the first sensor data slice from the first buffer into a cyclic buffer region of the non-volatile memory of the data recorder, in parallel with generating, in a second buffer configured in the volatile memory, a second sensor data slice using second outputs from the plurality of sensors, wherein the first sensor data slice is passed from the first buffer in the volatile memory to the cyclic buffer region in the non-volatile memory; and
in response to an event, retrieving sensor data from the cyclic buffer region and storing the sensor data into files organized under the file system mounted in the file system region,
wherein the cyclic buffer region has a capacity to store more than two sensor data slices; wherein each respective sensor data slice has a predetermined size and a structure identified by a schedule specifying a predetermined amount of sensor data from the plurality of sensors, a sensor of the plurality of sensors that provides the sensor data, and timing of generation of the sensor data relative to a timestamp of the respective sensor data slice.

17. The method of claim 16, further comprising:
flushing the second sensor data slice from the second buffer into the cyclic buffer region of the non-volatile memory of the data recorder, in parallel with generating, in the first buffer configured in the volatile memory, a third sensor data slice using third outputs from the plurality of sensors.

18. The method of claim 16, further comprising, prior to the event:
writing each sensor data slice flushed from the volatile memory into a first empty slot in the cyclic buffer region before the cyclic buffer region is full; and
erasing, after the cyclic buffer region is full, an oldest data slice from the cyclic buffer region to provide a second empty slot to accommodate a sensor data slice to be flushed from the volatile memory.

19. The method of claim 18, further comprising:
allocating a first namespace from the non-volatile memory for the cyclic buffer region;
allocating a second namespace from the non-volatile memory for the file system region; and
accessing the cyclic buffer region and the file system region using logical block addressing addresses in the first namespace and the second namespace and a non-volatile memory express protocol.

* * * * *